United States Patent
Tanikawa et al.

(10) Patent No.: US 8,955,501 B2
(45) Date of Patent: Feb. 17, 2015

(54) PCV VALVE MOUNTING STRUCTURES

(75) Inventors: Hironori Tanikawa, Anjo (JP); Naotaka Yoshikawa, Nagoya (JP); Hirokazu Konohara, Inazawa (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 82 days.

(21) Appl. No.: 13/030,241

(22) Filed: Feb. 18, 2011

(65) Prior Publication Data

US 2011/0203559 A1   Aug. 25, 2011

(30) Foreign Application Priority Data

Feb. 19, 2010   (JP) ................................ 2010-034625

(51) Int. Cl.
| | |
|---|---|
| *F01M 13/00* | (2006.01) |
| *F02M 35/10* | (2006.01) |
| *F01M 13/02* | (2006.01) |
| *F02M 25/06* | (2006.01) |

(52) U.S. Cl.
CPC ..... *F02M 35/10222* (2013.01); *F01M 13/0011* (2013.01); *F01M 13/023* (2013.01); *F02M 25/06* (2013.01); *Y02T 10/121* (2013.01)
USPC ........................................................ 123/574

(58) Field of Classification Search
CPC .......... F01M 13/0011; F01M 13/0027; F01M 2013/0038; F01M 2013/0044; F01M 2013/0455; F01M 13/023
USPC .................................................. 123/572, 574
See application file for complete search history.

(56) References Cited

U.S. PATENT DOCUMENTS

| | | | |
|---|---|---|---|
| 6,009,683 A | | 1/2000 | Grewe et al. |
| 6,009,863 A | * | 1/2000 | Tochizawa .................... 123/572 |
| 2008/0099000 A1 | * | 5/2008 | Suzuki et al. ................. 123/574 |

FOREIGN PATENT DOCUMENTS

| | | |
|---|---|---|
| DE | 10105555 A1 | 8/2002 |
| JP | S63158515 U | 10/1988 |
| JP | 06-229221 | 8/1994 |
| JP | 2000-008827 A | 1/2000 |
| JP | 2000-220431 A | 8/2000 |
| JP | 2000-220433 A | 8/2000 |
| JP | 2000-220434 A | 8/2000 |
| JP | 2000-230412 A | 8/2000 |
| JP | 2001-263036 A | 9/2001 |
| JP | 2002-195018 A | 7/2002 |
| JP | 2005-273562 A | 10/2005 |
| JP | 2007315206 A | 12/2007 |
| JP | 2009-209813 | 9/2009 |

OTHER PUBLICATIONS

Non-English Action dated Apr. 30, 2013 for Application No. JP 2010-034625 and an English-language version thereof.
Patent Abstracts of Japan English abstract of JP 2000-230412 A.
Patent Abstracts of Japan English abstract of JP 2000-220431 A.
Patent Abstracts of Japan English abstract of JP 2000-220433 A.

(Continued)

*Primary Examiner* — Lindsay Low
*Assistant Examiner* — Jacob Amick
(74) *Attorney, Agent, or Firm* — Ladas & Parry LLP

(57) ABSTRACT

A mounting structure for mounting a PCV valve includes a mount recess formed in at least one of joint surfaces of a cylinder head and an intake manifold, so that at least a part of the PCV valve can be fitted into the mount recess.

17 Claims, 4 Drawing Sheets

(56) References Cited

OTHER PUBLICATIONS

Patent Abstracts of Japan English abstract of JP 2000-220434 A.
Patent Abstracts of Japan English abstract of JP 2002-195018 A.
German Office Action dated May 13, 2013, corresponding to German Patent Application No. 10 2011 011 719.9, with full English translation.
Japanese Office Action dated Sep. 24, 2013, corresponding to Japanese Patent Application No. 2010-034625; with English translation.
German Office Action dated Nov. 11, 2013 corresponding to German Patent Application No. DE102011011719.9-13; with English language translation.

\* cited by examiner

PCV VALVE MOUNTING STRUCTURES

This application claims priority to Japanese patent application serial number 2010-034625, the contents of which are incorporated herein by reference.

BACKGROUND OF THE INVENTION

1. Field of the Invention

The present invention relates to mounting structures for PCV valves (positive crankcase ventilation valves) used for controlling flow of blow-by gas.

2. Description of the Related Art

A known PCV valve mounting structure is disclosed, for example, in Japanese Laid-Open Publication No. 6-229221. The mounting structure disclosed in this publication is shown in a vertical sectional view in FIG. 6.

As shown in FIG. 6, according to the known mounting structure, a base end portion (lower end portion as viewed in FIG. 6) of a PCV valve 130 is mounted to a cylinder head cover 110, and a base end portion (upper end portion as viewed in FIG. 6) of the PCV valve 130 is mounted to a surge tank 112. More specifically, a flat valve mounting portion 120 is formed on the upper portion of the cylinder head cover 110, and a valve mounting hole 136 is formed in the valve mounting portion 120. The base end portion of the PCV valve 130 is inserted into the valve mounting hole 136, so that a gas inlet port 142 formed at the base end portion of the PCV valve 130 communicates with inside of the cylinder head cover 110. A flat valve mounting portion 122 is formed on the lower portion of the surge tank 112, and a valve mounting hole 144 is formed in the valve mounting portion 122. A terminal end portion of the PCV valve 130 is inserted into the valve mounting hole 144. Therefore, a gas reflux port 150 formed at the terminal end portion of the PCV valve 130 communicates with inside of the surge tank 112. When a load is applied to an engine, a negative pressure is produced by an intake air and can operate the PCV valve 130 mounted to the cylinder head cover 110 and the surge tank 112 as described above for adjusting the amount of the brow-by gas refluxed from within the cylinder head 110 to the surge tank 112 when the brow-by gas produced at the engine is refluxed into an intake air system of the engine.

In the case of the known mounting structure, the base end portion of the PCV valve 130 is inserted into the valve mounting hole 136 while the terminal end portion of the PCV valve 130 is inserted into the valve mounting hole 144 formed in the valve mounting portion 122 of the surge tank 112. However, an intermediate portion of the PCV valve 130 positioned between the base end portion and the terminal end portion is exposed to the outside at a position between the cylinder head cover 110 and the surge tank 112. Therefore, if the intermediate portion of the PCV valve 130 is exposed to the atmospheric air (in particular, air stream produced during running of a vehicle) when the atmospheric air is at an extremely low temperature, a water content contained in the blow-by gas flowing through the PCV valve 130 from the gas inlet port 142 to the gas reflux port 150 may be frozen.

Therefore, there is a need in the art for a PCV valve mounting structure that can inhibit or prevent, a water content contained in the blow-by gas from being frozen up within the PCV valve.

SUMMARY OF THE INVENTION

A mounting structure for mounting a PCV valve includes a mount recess formed in at least one of joint surfaces of a cylinder head and an intake manifold, so that at least a part of the PCV valve can be fitted into the mount recess when the cylinder head and the intake manifold are joined together at the joint surfaces.

DETAILED DESCRIPTION OF THE INVENTION

Figure 1:
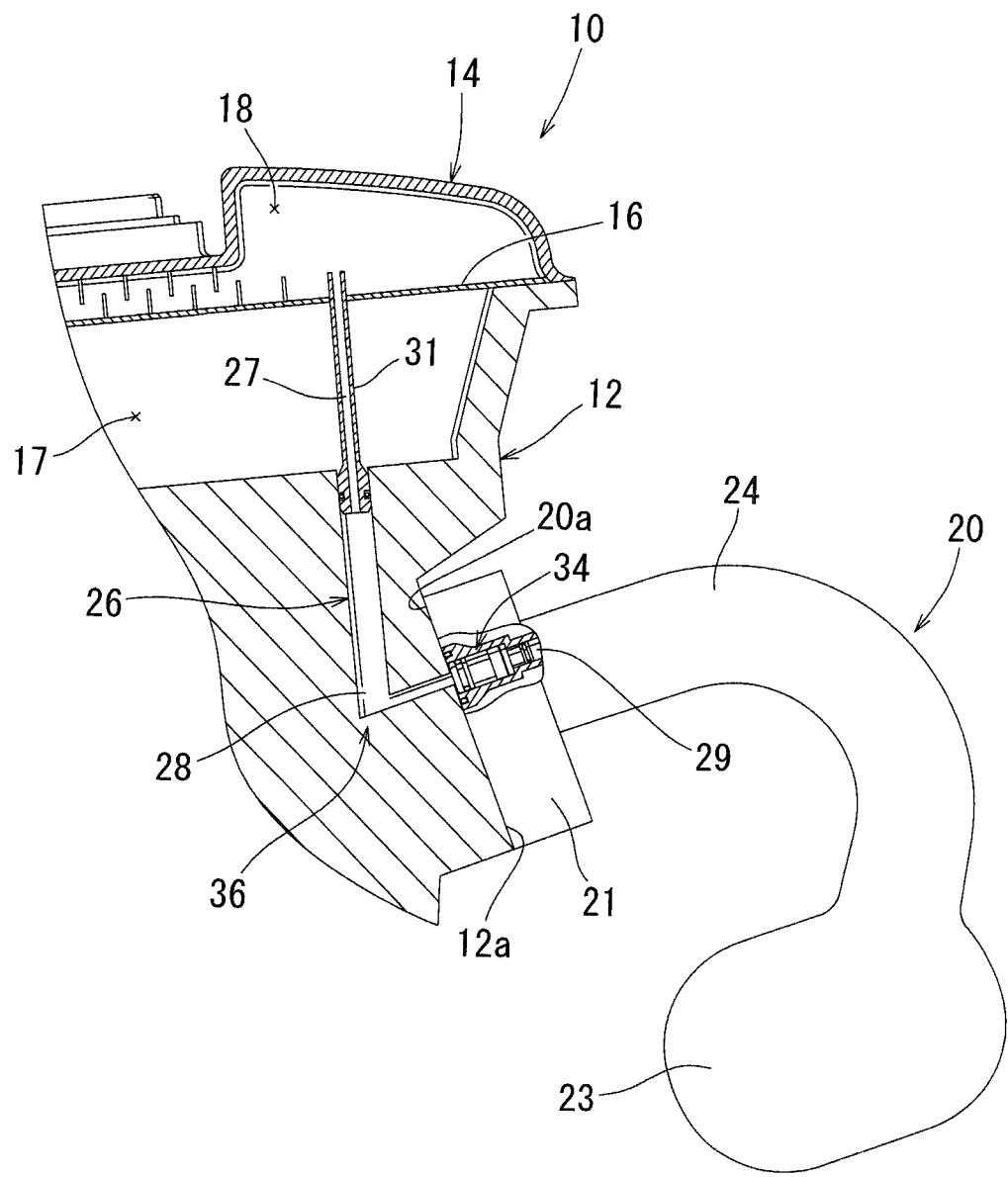
FIG. 1 is a sectional view of a blow-by gas refluxing device incorporating a PCV valve mounting structure according to a first example.

Each of the additional features and teachings disclosed above and below may be utilized separately or in conjunction with other features and teachings to provide improved PCV valve mounting structures. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a mounting structure for mounting a PCV valve includes a mount recess formed in at least one of joint surfaces of a cylinder head and an intake manifold for joining to the joint surface of the cylinder head. At least a part of the PCV valve can be fitted into the mount recess. When the cylinder head and the intake manifold are joined together at the joint surfaces, the PCV valve is accommodated within at least one of the cylinder head and the intake manifold at a position proximal to or across the joint surfaces.

Therefore, it is possible to protect the entire PCV valve from the influence of the atmospheric air (in particular, air stream produced during running of a vehicle). As a result, it is possible to prevent a water content contained in the blow-by gas from being frozen within the PCV valve.

Further, by joining the cylinder head and the intake manifold together after fitting the PCV valve into the mount recess formed in one of the joint surfaces, the PCV valve can easily be brought to be accommodated within at least one of the cylinder head and the intake manifold.

In the case that only a part of the PCV valve can be fitted into the mount recess, the mounting structure may further include a fitting recess formed in the other of the joint surfaces and capable of fitting with the other part of the PCV valve.

In this case, it is possible to position the cylinder head and the intake manifold relative to each other due to fitting of the fitting recess with the other part of the PCV valve when the cylinder head and the intake manifold are joined together.

A resilient member may be provided for pressing the PCV valve against the cylinder head, so that the PCV can be held in contact with the cylinder head. With this arrangement, the heat of the engine can be efficiently transmitted to the PCV valve to further reliably prevent the water content from being frozen within the gas passage of the PCV valve.

The PCV valve may have a valve case made of resin. The resin valve case can be manufactured at a lower cost and may be lighter in weight in comparison with the case that the valve case is made of metal.

The mounting structure may further include a sealing device for sealing between the joint surfaces at a position around the PCV valve.

Various examples will now be described with reference to the drawings.

First Example

A PCV valve mounting structure according to a first example is used to be provided in a blow-by passage of a blow-by gas refluxing device that can reflux blow-by gas into an intake air system of an engine. More specifically, the blow-by gas may leak from between a piston ring and a cylinder wall of the engine into a crank chamber. For the purpose of explanation, a general construction of the blow-by gas refluxing device will be first described, and the PCV valve mounting structure will be explained after that.

Referring to FIG. 1, a cylinder head cover 14 is mounted to a cylinder head 12 of an engine 10. A baffle plate 16 is mounted between the cylinder head 12 and the cylinder head cover 14, so that an internal space defined between the cylinder head 12 and the cylinder head cover 14 is divided into a cam chamber 17 and an oil separator chamber 18 disposed on a lower side and an upper side of the internal space, respectively. The cam chamber 17 communicates with a crank chamber (not shown) of the engine 10. An opening (not shown) is formed in the baffle plate 16 for communicating between the cam chamber 17 and the oil separator chamber 18. The oil separator chamber 18 is configured to be able to separate an oil content, such as oil droplets and oil mist, from the blow-by gas and to return the oil content into the cam chamber 17. Although not shown in FIG. 1, a cam mechanism for driving intake valves and exhaust valves is disposed within the cam chamber 17. Intake ports and exhaust ports (not shown) are formed in the cylinder head 12 and communicate with respective combustion chambers. The intake valves and the exhaust valves are disposed at the cylinder head 12. The cylinder head 12 is secured to a cylinder block (not shown).

A flange 21 formed on the downstream end of an intake manifold 20 is joined to the cylinder head 12 by a suitable fastening device. The intake manifold 20 is made of resin and has a surge tank 23 for introducing intake air (fresh air) thereinto and distribution pipes 24 communicating with a downstream side of the surge tank 23 for distributing the intake air from the surge tank 23 into respective engine cylinders. The distribution pipes 24 communicate with the intake ports (not shown) formed in the cylinder head cover 14. Although not shown in FIG. 1, a throttle valve for controlling the flow rate of the intake air is disposed on the upstream side of the surge tank 23 of the intake manifold 20, and an air cleaner is disposed on the upstream side of the throttle valve. The air cleaner, the throttle device and the intake manifold 20, etc., constitute an intake air system for introducing intake air into the intake ports of the cylinder head 12. In place of the fastening device, clips, a snap-fitting device or any other suitable device can be used for joining the intake manifold 20 to the cylinder head 12.

The oil separator chamber 18 and an intake air passage (not shown) defined within the intake manifold 20 communicate with each other via a blow-by gas passage 26. The blow-by gas passage 26 includes a first passage portion 27, a second passage portion 28 and a third passage portion 29. The second passage portion 27 is formed in the cylinder head 12 and has an L-shaped configuration. An upstream end (upper end) of the second passage portion 28 is open into the cam chamber 17. A downstream end (lower end) of the second passage portion 28 extends laterally (rightward in FIG. 1) and is open at a joint surface 12a where the cylinder head 12 is joined to the flange portion 21 of the intake manifold 20. The first passage portion 27 is defined in a gas introduction pipe 31 that is inserted into an upstream end (upper end) of the second passage portion 28 so as to be joined thereto. The oil separator chamber 18 and the second passage portion 28 communicate with each other via the first passage portion 27.

Figure 2:
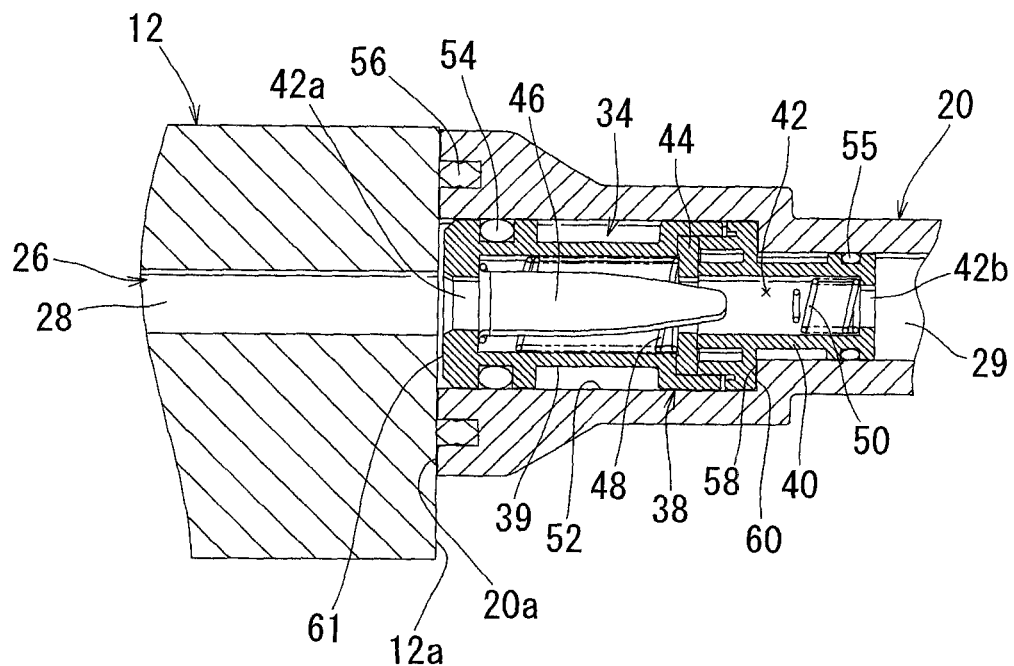
FIG. 2 is a sectional view showing the PCV valve mounting structure.

The third passage portion 29 is formed in the intake manifold 20. Referring to FIG. 2, an upstream end (left end as viewed in FIG. 2) of the third passage portion 29 is opened at a joint surface 20a of the intake manifold 20 for joining to the joint surface 12a of the cylinder head 12. A downstream end (not shown) of the third passage portion 29 communicates with the intake air passage defined in the intake manifold 20 (i.e., the passages defined in the distributing pipes 24 or the internal space within the surge tank 23). The upstream end of the third passage portion 29 and the downstream end of the second passage portion 28 communicate with each other in a manner like a straight path and have the same axis. In the path of the blow-by gas passage 26, more specifically, at a position between the joint surface 12a of the cylinder head 12 and the joint surface 20a of the intake manifold 20, a PCV valve (positive crankcase ventilation valve) 34 is provided. The construction of the PCV valve 34 will be explained later.

During the operation (driving) of the engine, the negative pressure of the intake air (hereinafter called "intake air negative pressure" within the intake manifold 20 is applied to a crank chamber (not shown) of the engine via the blow-by gas passage 26, the oil separator chamber 18 and the cam chamber 17. Therefore, blow-by gas produced in the crank chamber is refluxed into the intake manifold 20 via the cam chamber 17, the oil separator chamber 18 and the first to third passage portions 27, 28 and 29 of the blow-by gas passage 26. Accordingly, fresh air (external air) is introduced into the crank chamber via a fresh air introduction passage (not shown). During refluxing of the blow-by gas, the PCV valve 34 operates in response to the load condition of the engine or the intake air negative pressure to control the amount of flow or the flow rate of the refluxing blow-by gas that flows from the second passage portion 28 to the third passage portion 29 of the blow-by gas passage 26. The blow-by gas passage 26 and the PCV valve 34 constitute a blow-by gas refluxing device 36.

The mounting structure for mounting the PCV valve 34 will now be described with reference to FIG. 2. First, the construction of the PCV valve 34 will be described. The PCV valve 34 has a valve case 38 that is made of resin and has a hollow cylindrical configuration. The valve case 38 is separated into a main case member 39 and an auxiliary case member 40 along an axial direction. A connecting side end portion (right end portion as viewed in FIG. 2) of the main case member 39 is coaxially fitted on a connecting side end portion (left end portion as viewed in FIG. 2) of the auxiliary case member 40, so that a gas passage 42 is defined by the internal spaces of the main and auxiliary case members 39 and 40 so as to extend therebetween. The valve case 38 has an outer shape like a stepped shaft with a leading end portion (right end portion) of the auxiliary case member 40 forming a small diameter portion of the stepped shaft. For the purpose of explanation, an end portion (left end portion as viewed in FIG. 2) of the main case member 39 on the side opposite to the connecting side end portion will be referred to as a base end portion of the PCV valve 34 or a base end portion of the valve case 38, and an end portion (right end portion as viewed in FIG. 2) will be referred to as a leading end portion of the PCV valve 34 or a leading end portion of the valve case 38.

An opening formed at the base end portion of the valve case 38 serves as a gas inlet port 42a of the gas passage 42. On the other hand, an opening formed at the leading end portion (or a small diameter portion) of the valve vase 38 serves as a gas outlet port 42b of the gas passage 42. A valve seat 44, a valve member 46 and a valve spring 48 are disposed within the internal space defined in the main case member 39. The valve seat 44 has a configuration like an annular plate. The outer peripheral portion of the valve seat 44 is held between the main and auxiliary case members 39 and 40. The internal space of the main case member 39 serves as a valve chamber that receives the valve member 46 and the valve spring 48 therein and communicates with the internal space of the auxiliary case member 40 through a central hole formed in the valve seat 44.

The valve member 46 has a substantially cylindrical configuration and is received within the internal space of the main case member 39 so as to be movable in an axial direction (right and left direction in FIG. 2). The leading end portion (right end portion as viewed in FIG. 2) of the valve member 46 is tapered toward the leading end and has a diameter decreasing toward the leading end so as to be insertable into the central hole of the valve seat 44. The valve spring 48 is disposed between the valve seat 44 and the valve member 46. The valve spring 48 is a coil spring and normally biases the valve member 46 toward the gas inlet port 42a (leftward as viewed in FIG. 2). Therefore, when the valve member 46 moves forwardly in the axial direction (rightwardly as viewed in FIG. 2), a clearance or a cross sectional area of a passage defined between the valve seat 44 and the valve member 46 changes, so that a flow rate of the blow-by gas flowing through the PCV valve 34 can be controlled.

A buffer spring 50 is a coil spring and is disposed within the auxiliary case member 40. When the valve member 46 has moved to its maximum stroke end, the leading end of the valve member 46 may contact the buffer spring 50. With this arrangement, it is possible to prevent the leading end portion of the valve member 46 from being offset from the axis of movement of the valve member 46 and from being swung as the valve member 46 moves to its maximum stroke end. In this example, the components, such as the valve seat 44, the valve member 46, the valve spring 48 and the buffer spring 50, of the PCV valve 34 other than the valve case 38 are made of metal. However, at least one of these components (such as the valve seat 44, the valve member 46, the valve spring 48 and the buffer spring 50) other than the valve case 38 may be made of resin.

The structure for mounting the PCV valve 34 will now be described. A mount recess 52 is formed in the joint surface 20a of the intake manifold 20 so as to communicate with the upstream end of the third passage portion 29. In this example, the mount recess 52 is configured like a bore coaxial with the upstream end of the third passage portion 29 and having a diameter larger than that of the upstream end of the third passage portion 29. In the following explanation, the upstream end of the third passage portion 29 positioned proximal to the mount recess 52 will be referred to as a small diameter passage part of the third passage portion 29. A large diameter portion of the valve case 38 of the PCV valve 34 is fitted into the mount recess 52, while the leading end portion (or a small diameter portion) of the PCV valve 34 is fitted into the small diameter passage part of the third passage portion 29. Therefore, the gas outlet port 24b of the valve case 38 of the PCV valve 34 communicates with the small diameter passage part of the third passage portion 29. An O-ring 54 is fitted on the base end portion of the valve case 38 so as to resiliently contact the inner circumferential surface of the mount recess 52. An O-ring 55 is fitted on the leading end portion (small diameter portion) of the valve case 38 so as to resiliently contact the inner circumferential surface of the small diameter passage part. In this example, a stepped surface formed between the large diameter portion and the small diameter portion of the valve case 38 is positioned to be proximate to or contact with a stepped surface 58 formed between the mount recess 52 and the small diameter passage part of the third passage portion 29 of the intake manifold 20.

The intake manifold 20 having the PCV valve 34 mounted thereto as described above is then joined to the cylinder head 12, so that the PCV valve 34 is accommodated within the intake manifold 20 at a position proximal to the joint surfaces 12a and the 20a. In addition, the gas inlet port 42a of the valve case 38 of the PCV valve 34 is brought to communicate with the second passage portion 28 of the cylinder head 12. Further, a part of the joint surface 12a of the cylinder head 12 defining the peripheral edge of the downstream end of the second passage portion 28 is proximate to or contact with a base end surface 61 or an end surface of the base end portion of the valve case 38. A gasket 56 is fitted into a corresponding recess formed in the joint surface 20a in a manner surrounding the mount recess 52 and resiliently contacts the joint surface 12a of the cylinder head 12.

According to the PCV valve mounting structure of the above example, the PCV valve 34 is accommodated within the intake manifold 20 at a position proximal to the joint surface 12a of the cylinder head 12 and the joint surface 20a of the intake manifold 20 by fitting the PCV valve 34 into the mount recess 52 formed in the joint surface 20a of the intake manifold 20. Therefore, it is possible to protect the entire PCV valve 34 from the influence of the atmospheric air (in particular, air stream produced during miming of a vehicle) by the cylinder head 12 and the intake manifold 20. As a result, it is possible to prevent the water content of the blow-by gas from being frozen within the gas passage 42 of the PCV valve 34.

Further according to the above mounting structure, it is possible to easily accommodate the PCV valve 34 within the intake manifold 20 at a position proximal to the joint surface 12a of the cylinder head 12 and the joint surface 20a of the intake manifold 20 by joining the cylinder head 12 and the intake manifold 20 together with the PCV valve 34 fitted into the mount recess 52 formed in the joint surface 20a of the intake manifold 20.

Furthermore, the assembling operation of the PCV valve 34 can be efficiently made by joining the cylinder head 12 and the intake manifold 20 together with the PCV valve 34 fitted into the intake manifold 20.

Furthermore, the valve case 38 (including the main and auxiliary case members 39 and 40) of the PCV valve 34 is made of resin. Therefore, it is possible to reduce the manufacturing cost and the weight of the PCV valve 34 in comparison with the case that the valve case 38 is made of metal.

Second Example

A second example will now be described with reference to FIG. 3 that is a sectional view showing a PCV valve mounting structure according to this example. The second example is a modification of the first example, and therefore, like members are given the same reference numerals as the first example and the description of these members will not be repeated.

Figure 3:
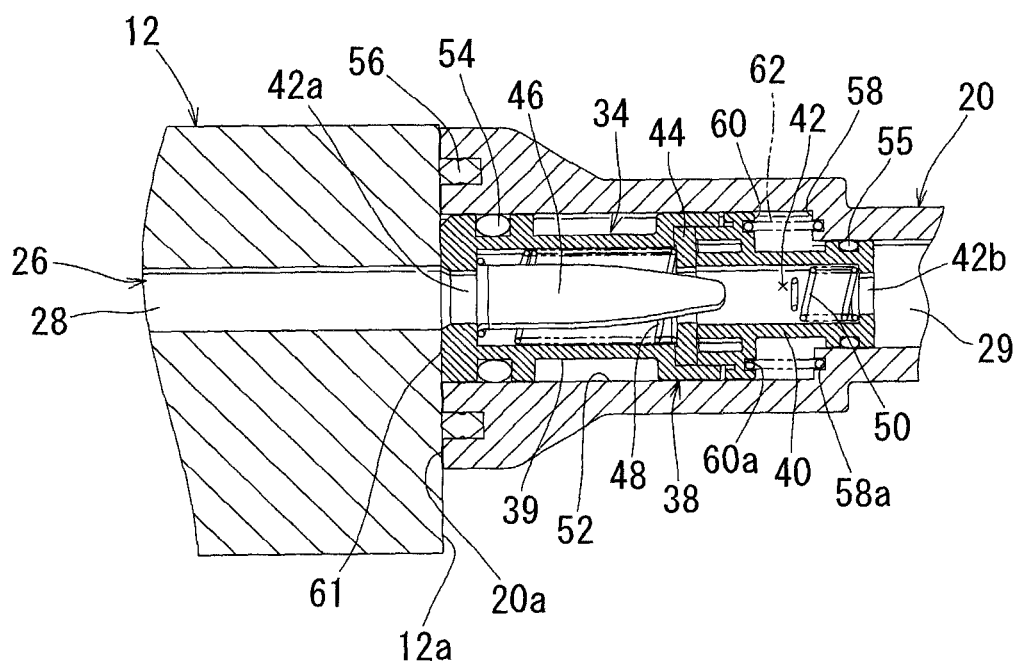
FIG. 3 is a sectional view similar to FIG. 2 but showing a PCV valve mounting structure according to a second example.

Referring to FIG. 3, according to the second example, the stepped surface 58 of the mount recess 52 of the intake manifold 20 and the stepped surface 60 of the valve case 38 of the PCV valve 34 are spaced from each other by a predetermined distance. In order to provide such a space between the stepped surfaces 58 and 60, the length in the axial direction (depth) of the mount recess 52 of the intake manifold 52 is set to be longer than that of the mount recess 52 of the first example.

A pressing spring 62 serving as a resilient member is interposed between the stepped surfaces 58 and 60. The pressing spring 62 may be made, for example, of metal, and is loosely fitted on the leading end portion (small diameter portion) of the valve case 38. Therefore, by the biasing force of the pressing spring 62, the valve case 38 or the PCV valve 34 is pressed toward the cylinder head 12, so that the base end surface 61 of the valve case 38 is held in contact with the joint surface 12a of the cylinder head 12. Further, the stepped surfaces 58 and 60 have annular grooves 58a and 60a, respectively, into which opposite end portions of the pressing spring 62 can be fitted.

According to the PCV valve mounting structure of this example, the pressing spring 62 is provided for pressing the PCV valve 34 against the cylinder head 12. Therefore, the PCV valve 34 can be held in contact with the cylinder head 12. As a result, it is possible to efficiently transmit the heat of the engine 10 (see FIG. 1) to the valve case 38 of the PCV valve 34 for further effectively prevent the water content of the blow-by gas from being frozen within the gas passage 42 of the PCV valve 34. In addition, it is possible to absorb potential displacement in the axial direction of the valve case 38 of the PCV valve 34 by the resiliency of the pressing spring 62. Further, because the opposite end portions of the pressing spring 62 are fitted into the annular grooves 58a and 60a of the stepped surfaces 58 and 60, it is possible to stably support the pressing spring 62. The pressing spring 62 may be replaced with any other resilient member, such as a leaf spring and a cushion rubber.

Third Example

A third example will now be described with reference to FIG. 4 that is a sectional view showing a PCV valve mounting structure according to this example. The third example is a modification of the second example, and therefore, like members are given the same reference numerals as the second example and the description of these members will not be repeated.

Figure 4:
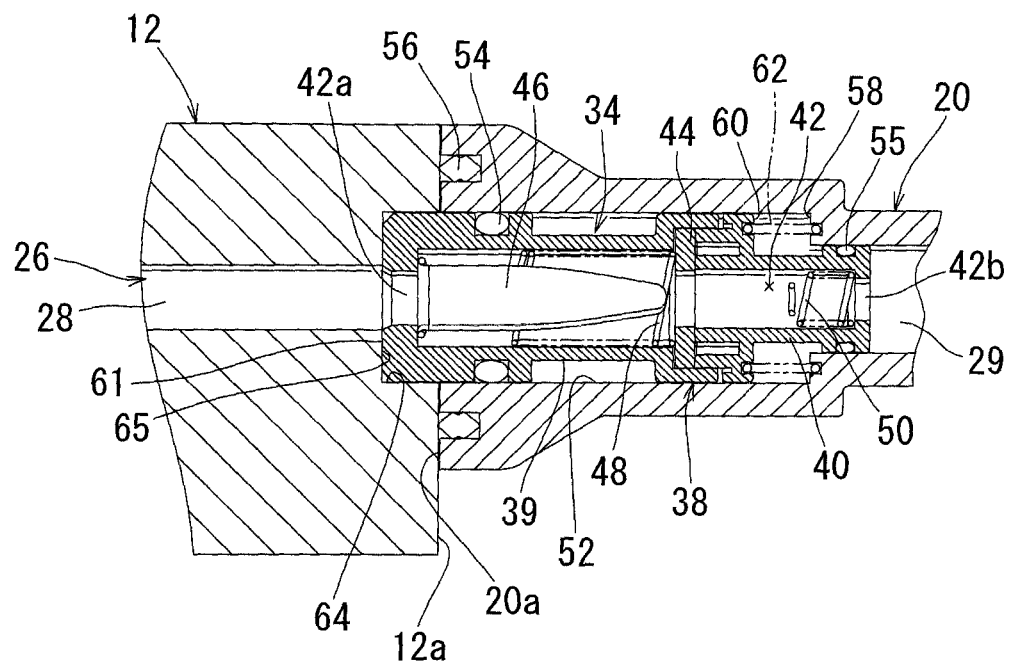
FIG. 4 is a sectional view similar to FIG. 2 but showing a PCV valve mounting structure according to a third example.

Referring to FIG. 4, according to the third example, a fitting recess 64 is formed in the joint surface 12a of the cylinder head 12 and communicates with the downstream end of the second passage portion 28. More specifically, the fitting recess 64 is coaxial with the downstream end of the second passage portion 28 and has a diameter larger than that of the downstream end of the second passage portion 28. In the following explanation, the downstream end of the second passage portion 28 positioned proximal to the fitting recess 64 will be referred to as a small diameter passage part of the second passage portion 28.

In the third example, the axial length of the main case member 39 of the valve case 38 is set to be longer than that of the second example shown in FIG. 3, so that the base end portion of the valve case 38 extends from the joint surface 20a of the intake manifold 20 by a predetermined distance. The base end portion of the valve case 38 extending from the joint surface 20a is fitted into the fitting recess 64, so that the gas inlet port 42a of the valve case 38 of the PCV valve 34 communicates with the small diameter passage part of the second passage portion 28. The base end surface 61 of the valve case 38 is held in contact with a stepped surface 65 formed within the cylinder head 12 at a position between the fitting recess 64 and the small diameter passage part of the second passage portion 28.

According to the mounting structure of the PCV valve 34 of this example, the base end portion of the valve case 38 of the PCV valve 34 is fitted into the fitting recess 64 formed in the joint surface 12a of the cylinder head 12. Therefore, the cylinder head 12 and the intake manifold 20 can be positioned relative to each other when they are joined together. In addition, because the base end portion of the valve case 38 of the PCV valve 34 is fitted into the fitting recess 64 formed in the joint surface 12a of the cylinder head 12, the heat of the engine 10 (see FIG. 1) can be efficiently transmitted to the valve case 38 of the PCV valve 34, so that the water content contained in the blow-by gas within the gas passage 42 of the PCV valve 34 can be further reliably prevented from being frozen.

Fourth Example

A fourth example will now be described with reference to FIG. 5. The fourth example is a modification of the first example, and therefore, like members are given the same reference numerals as the first example and the description of these members will not be repeated.

Figure 5:
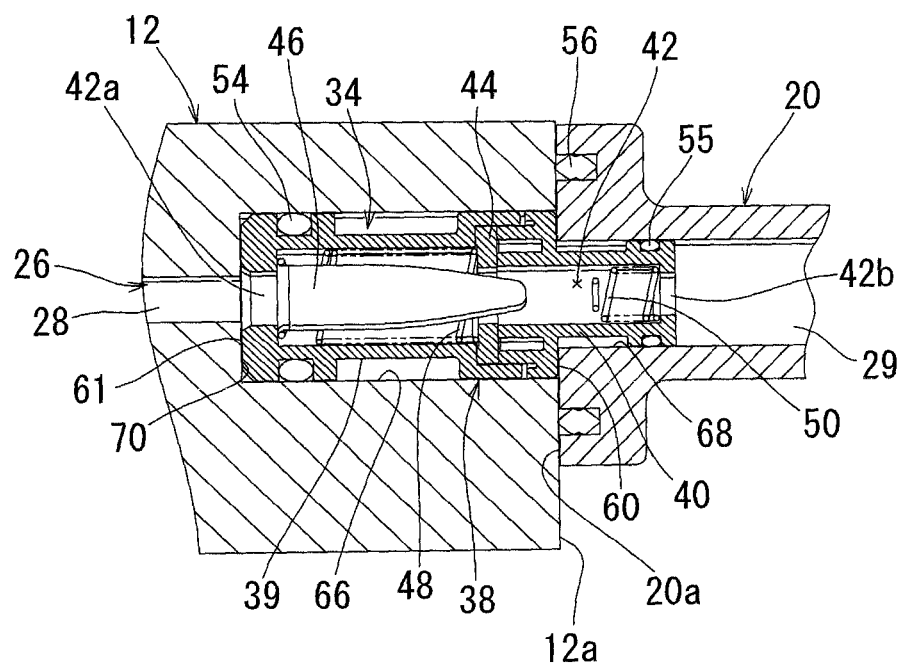
FIG. 5 is a sectional view similar to FIG. 2 but showing a PCV valve mounting structure according to a fourth example.
Figure 6:
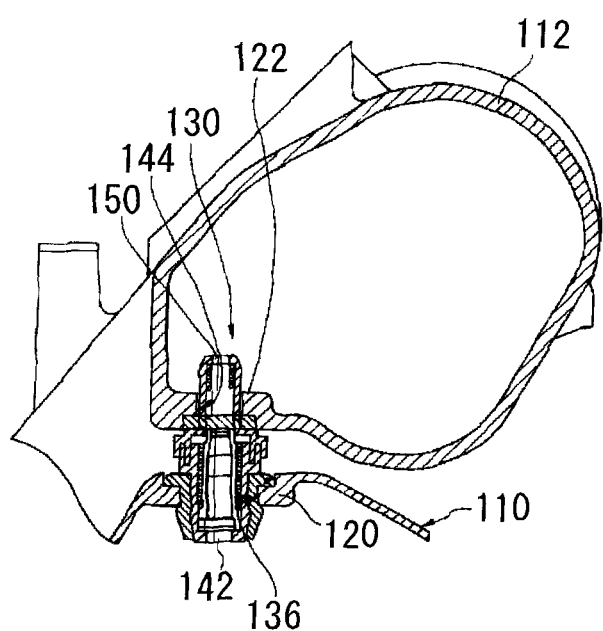
FIG. 6 is a sectional view showing a PCV valve mounting structure according to a known art.

Referring to FIG. 5, in this example, the large diameter portion of the valve case 38 of the PCV valve 34 is fitted into a mounting recess 66 formed in the joint surface 12a of the cylinder head 12 in place of the mounting recess 52 formed in the joint surface 20a of the intake manifold 20 of the first example (see FIG. 2). The mounting recess 66 communicates with the downstream end of the second passage portion 28 and is configured like a bore coaxial with the downstream end of the second passage portion 28 and having a diameter larger than that of the downstream end of the second passage portion 28. In the following explanation, the downstream end of the second passage portion 28 positioned proximal to the mount recess 66 will be referred to as a small diameter passage part of the second passage portion 28. The large diameter portion of the valve case 39 of the PCV valve 34 is fitted into the mount recess 66, so that the gas inlet port 42a of the valve case 38 communicates with the small diameter passage part of the second passage portion 28. The leading end portion (small diameter portion) of the valve case 38 extends from the joint surface 12a of the cylinder head 12. The O-ring 54 fitted on the base end portion of the valve case 38 resiliently contacts the inner circumferential surface of the mount recess 66.

In addition, in this example, the upstream end part of the third passage portion 29 of the intake manifold 20 does not include the mount recess 52 as provided in the first example (see FIG. 2) but includes only the small diameter passage part. A part of the upstream end part of the third passage portion 29 including the upstream opening is configured as a fitting recess 68 formed in the joint surface 20*a* of the intake manifold 20.

The cylinder head 12 having the PCV valve 34 mounted therein as described above is joined to the intake manifold 20, so that the PCV valve 34 is accommodated within the cylinder head 12 at a position proximal to the joint surface 12*a* of the cylinder head 12 and the joint surface 20*a* of the intake manifold 20. In addition, the small diameter portion (leading end portion) of the valve case 38 is fitted into the fitting recess 68 of the third passage 29 of the intake manifold 20, so that the gas outlet port 42*b* of the valve case 38 of the PCV valve 34 communicates with the third passage 29. Further, the O-ring 55 fitted on the valve case 38 resiliently contacts the inner circumferential surface of the fitting recess 68 of the third passage portion 29. Furthermore, in this example, the stepped surface 60 of the valve case 38 is proximal to or in contact with the joint surface 20*a* of the intake manifold 20. The base end surface 61 of the valve case 30 is proximal to or in contact with a stepped surface 70 formed in the cylinder head 12 at a position between the mount recess 66 and the small diameter passage part of the second passage portion 28.

According to the PCV valve mounting structure of the fourth example, it is possible to accommodate the PCV valve 34 within the cylinder head 12 at a position proximal to the joint surface 12*a* of the cylinder head 12 and the joint surface 20*a* of the intake manifold 20 by joining the cylinder head 12 and the intake manifold 20 together in the state that the PCV valve 34 is fitted into the mount recess 66 formed in the joint surface 12*a* of the cylinder head 12.

In addition, the assembling operation of the PCV valve 34 can be efficiently made by joining the cylinder head 12 and the intake manifold 20 together with the PCV valve 34 fitted into the cylinder head 12.

Furthermore, the leading end portion (small diameter portion) of the valve case 38 of the PCV valve 34 is fitted into the fitting recess 68 formed in the joint surface 20*a* of the intake manifold 20. Therefore, due to fitting of the leading end portion (small diameter portion) of the valve case 38 of the PCV valve 34 into the fitting recess 68 formed in the joint surface 20*a* of the intake manifold 20, the cylinder head 12 and the intake manifold 20 can be positioned relative to each other when they are joined together. It may be possible that the mount recess 66 of the cylinder head 12 can be fitted not only with the large diameter portion of the valve case 38 of the PCV valve 34 but with the entire valve case 38 including the small diameter portion.

(Possible Modifications)

Although the blow-by gas passage 26 in the above examples communicates with the oil separator chamber 18, it may communicate with any other chamber or passage that communicates with the crank chamber of the engine. Further, although the valve case 38 of the PCV valve 34 is made of resin, it may be made of metal.

What is claimed is:

1. A mounting structure for mounting a PCV valve, comprising:
    a mount recess formed in one of a joint surface of a cylinder head and a joint surface of an intake manifold for joining to the joint surface of the cylinder head, wherein:
    at least a part of the PCV valve is fitted into the mount recess; and
    when the cylinder head and the intake manifold are joined together at the joint surfaces, the PCV valve is accommodated within at least one of the cylinder head and the intake manifold at a position proximal to or across the joint surfaces;
    wherein the PCV valve includes:
        a valve case having a side surface fitted into the mount recess; and
        a valve member movably disposed within the valve case;
    wherein the cylinder head and the intake manifold include a passage portion on the side of the cylinder head and a passage portion on the side of the intake manifold, respectively, the passage portions communicating with each other at the joint surfaces for the flow of blow-by gas;
    wherein the PCV valve is received within at least one of the passage portions;
    wherein the passage portions communicate with each other in a manner like a straight path at least in a region proximal to the joint surfaces; and
    wherein the passage portion on the side of the intake manifold includes a passage part positioned on a downstream side of the PCV valve with respect to a direction of flow of the blow-by gas from with the cylinder head into the intake manifold via the PCV valve;
    wherein a first O-ring is disposed between an outer circumference of the PCV valve and an inner circumferential wall of the passage portion on the side of the cylinder head, the first O-ring including a radially inner portion and a radially outer portion, the radially inner portion contacting the outer circumference of the PCV valve, and the radially outer portion contacting the inner circumferential wall of the passage portion on the side of the cylinder head;
    wherein a second O-ring is disposed between the outer circumference of the PCV valve and an inner circumferential wall of the passage portion on the side of the intake manifold, the second O-ring including a radially inner portion and a radially outer portion, the radially inner portion contacting the outer circumference of the PCV valve, and the radially outer portion contacting the inner circumferential wall of the passage portion on the side of the intake manifold;
    wherein the valve case includes a first portion located within the passage portion on the side of the cylinder head, and a second portion located within the passage portion on the side of the intake manifold;
    wherein the inner circumferential wall of the passage portion on the side of the intake manifold extends along the entire length of the second portion of the valve case; and
    wherein the first and second portions comprise the entire length of the valve case.

2. The mounting structure as in claim 1, wherein only a part of the side surface of the valve case of the PCV valve can be fitted into the mount recess.

3. The mounting structure as in claim 2, further comprising a fitting recess formed in the other of the joint surfaces and capable of fitting with the other part of the side surface of the valve case of the PCV valve.

4. The mounting structure as in claim 1, further comprising a resilient member pressing the valve case of the PCV valve against the cylinder head.

5. A mounting structure for mounting a PCV valve, comprising:
    a mount recess formed in one of a joint surface of a cylinder head and a joint surface of an intake manifold for joining to the joint surface of the cylinder head, wherein:
    the PCV valve is fitted into the mount recess;
    the PCV valve has a first end portion and a second end portion positioned on opposite sides in an axial direction; and when the cylinder head and the intake manifold are joined together at the joint surfaces, the PCV valve is accommodated within one of the cylinder head and the intake manifold in a state that the first end portion is opposed to the other of the joint surfaces and the second end portion is opposed to a stepped surface formed in the one of the cylinder head and the intake manifold and defining a bottom of the mount recess;

wherein the PCV valve includes:

a valve case having a side surface fitted into the mount recess; and a valve member movably disposed within the valve case;

wherein the cylinder head and the intake manifold include a passage portion on the side of the cylinder head and a passage portion on the side of the intake manifold, respectively, the passage portions communicating with each other at the joint surfaces for the flow of blow-by gas;

wherein the PCV valve is received within at least one of the passage portions;

wherein the passage portions communicate with each other in a manner like a straight path at least in a region proximal to the joint surfaces; and wherein the passage portion on the side of the intake manifold includes a passage part positioned on a downstream side of the PCV valve with respect to a direction of flow of the blow-by gas from within the cylinder head into the intake manifold via the PCV valve;

wherein a first O-ring is disposed between an outer circumference of the PCV valve and an inner circumferential wall of the passage portion on the side of the cylinder head, the first O-ring including a radially inner portion and a radially outer portion, the radially inner portion contacting the outer circumference of the PCV valve, and the radially outer portion contacting the inner circumferential wall of the passage portion on the side of the cylinder head;

wherein a second O-ring is disposed between the outer circumference of the PCV valve and an inner circumferential wall of the passage portion on the side of the intake manifold, the second O-ring including a radially inner portion and a radially outer portion, the radially inner portion contacting the outer circumference of the PCV valve, and the radially outer portion contacting the inner circumferential wall of the passage portion on the side of the intake manifold;

wherein the valve case includes a first portion located within the passage portion on the side of the cylinder head, and a second portion located within the passage portion on the side of the intake manifold;

wherein the inner circumferential wall of the passage portion on the side of the intake manifold extends along the entire length of the second portion of the valve case; and wherein the first and second portions comprise the entire length of the valve case.

6. The mounting structure as in claim 5, further comprising a biasing device disposed within the mount recess at a position between the first end portion of the PCV valve and the stepped surface, so that the first end portion of the PCV valve is pressed against the other of the joint surfaces when the cylinder head and the intake manifold are joined together at the joint surfaces.

7. A mounting structure for mounting a PCV valve, comprising:

a mount recess formed in one of a joint surface of a cylinder head and a joint surface of an intake manifold for joining to the joint surface of the cylinder head, and a fitting recess formed in the other of the joint surfaces, wherein:

the PCV valve has a first end portion and a second end portion positioned on opposite sides in an axial direction; and when the cylinder head and the intake manifold are joined together at the joint surfaces, the first end portion and the second end portion of the PCV valve are fitted into the mount recess and the fitting recess, respectively;

wherein the PCV valve includes:

a valve case having a side surface fitted into the mount recess and the fitting recess at the first end portion and the second end portion, respectively; and a valve member movably disposed within the valve case;

wherein the cylinder head and the intake manifold include a passage portion on the side of the cylinder head and a passage portion on the side of the intake manifold, respectively, the passage portions communicating with each other at the joint surfaces for the flow of blow-by gas;

wherein the PCV valve is received within at least one of the passage portions;

wherein the passage portions communicate with each other in a manner like a straight path at least in a region proximal to the joint surfaces; and wherein the passage portion on the side of the intake manifold includes a passage part positioned on a downstream side of the PCV valve with respect to a direction of flow of the blow-by gas from within the cylinder head into the intake manifold via the PCV valve;

wherein a first O-ring is disposed between an outer circumference of the PCV valve and an inner circumferential wall of the passage portion on the side of the cylinder head, the first O-ring including a radially inner portion and a radially outer portion, the radially inner portion contacting the outer circumference of the PCV valve, and the radially outer portion contacting the inner circumferential wall of the passage portion on the side of the cylinder head;

wherein a second O-ring is disposed between the outer circumference of the PCV valve and an inner circumferential wall of the passage portion on the side of the intake manifold, the second O-ring including a radially inner portion and a radially outer portion, the radially inner portion contacting the outer circumference of the PCV valve, and the radially outer portion contacting the inner circumferential wall of the passage portion on the side of the intake manifold;

wherein the valve case includes a first portion located within the passage portion on the side of the cylinder head, and a second portion located within the passage portion on the side of the intake manifold;

wherein the inner circumferential wall of the passage portion on the side of the intake manifold extends along the entire length of the second portion of the valve case; and wherein the first and second portions comprise the entire length of the valve case.

8. The mounting structure as in claim 7, wherein when the cylinder head and the intake manifold are joined together at the joint surfaces, the first end portion of the PCV valve is opposed to a first stepped surface formed in one of the cylinder head and the intake manifold and defining a bottom of the mount recess, and the second end portion of the PCV valve is opposed to a second stepped surface formed in the other of the cylinder head and the intake manifold and defining a bottom of the fitting recess.

9. The mounting structure as in claim 7, wherein the PCV valve has a stepped portion between the first end portion and the second end portion, and when the cylinder head and the intake manifold are joined together at the joint surfaces, the first end portion is opposed to a stepped surface formed in one of the cylinder head and the intake manifold and defining a bottom of the mount recess, and the stepped portion is opposed to the other of the joint surfaces.

10. The mounting structure as in claim 7, wherein:
each of the mount recess and the fitting recess has an inner circumferential surface; and
the side surface of the valve case has a length; and
the entire length of the side surface of the valve case faces to the inner circumferential surface of the mount recess and the inner circumferential surface of the fitting recess when the side surface is fitted into the mount recess and the fitting recess.

11. The mounting structure as in claim 10, wherein the inner circumferential surface of the mount recess and the inner circumferential surface of the fitting recess have different diameters from each other.

12. The mounting structure as in claim 1, wherein at least a part of the valve case directly contacts the cylinder head.

13. The mounting structure as in claim 5, wherein at least a part of the valve case directly contacts the cylinder head.

14. The mounting structure as in claim 7, wherein at least a part of the valve case directly contacts the cylinder head.

15. The mounting structure as in claim 1, wherein the inner circumferential wall of the passage portion on the side of the cylinder head extends along the entire length of the first portion of the valve case.

16. The mounting structure as in claim 5, wherein the inner circumferential wall of the passage portion on the side of the cylinder head extends along the entire length of the first portion of the valve case.

17. The mounting structure as in claim 7, wherein the inner circumferential wall of the passage portion on the side of the cylinder head extends along the entire length of the first portion of the valve case.

* * * * *